United States Patent
Brundage et al.

(10) Patent No.: US 6,724,914 B2
(45) Date of Patent: Apr. 20, 2004

(54) PROGRESSIVE WATERMARK DECODING ON A DISTRIBUTED COMPUTING PLATFORM

(75) Inventors: Trent J. Brundage, Tigard, OR (US); Brett T. Hannigan, Portland, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/978,332

(22) Filed: Oct. 16, 2001

(65) Prior Publication Data

US 2003/0072467 A1 Apr. 17, 2003

(51) Int. Cl.$^7$ .............................. G06K 9/00; H04L 9/00
(52) U.S. Cl. ..................... 382/100; 382/232; 380/51; 380/54; 713/176
(58) Field of Search .................... 382/100, 232; 380/51, 54; 713/176

(56) References Cited

U.S. PATENT DOCUMENTS

| | | | | |
|---|---|---|---|---|
| 5,568,570 A | * | 10/1996 | Rabbani | 382/238 |
| 5,809,139 A | * | 9/1998 | Girod et al. | 380/202 |
| 5,889,868 A | * | 3/1999 | Moskowitz et al. | 713/176 |
| 5,905,800 A | * | 5/1999 | Moskowitz et al. | 380/28 |
| 5,933,798 A | | 8/1999 | Linnartz | 702/191 |
| 6,122,403 A | | 9/2000 | Rhoads | 382/233 |
| 6,131,162 A | * | 10/2000 | Yoshiura et al. | 713/176 |
| 6,209,094 B1 | * | 3/2001 | Levine et al. | 713/176 |
| 6,332,030 B1 | * | 12/2001 | Manjunath et al. | 382/100 |
| 6,381,698 B1 | * | 4/2002 | Devanbu et al. | 713/170 |
| 6,385,329 B1 | * | 5/2002 | Sharma et al. | 382/100 |
| 6,393,060 B1 | * | 5/2002 | Jeong | 375/240.19 |
| 6,400,826 B1 | * | 6/2002 | Chen et al. | 382/100 |
| 6,499,105 B1 | * | 12/2002 | Yoshiura et al. | 713/176 |
| 6,505,160 B1 | * | 1/2003 | Levy et al. | 704/270 |
| 6,513,118 B1 | * | 1/2003 | Iwamura | 713/176 |
| 6,529,506 B1 | * | 3/2003 | Yamamoto et al. | 370/389 |
| 6,557,103 B1 | * | 4/2003 | Boncelet et al. | 713/176 |

OTHER PUBLICATIONS

Barni et al. "A new detector for the optimum recovery of nonadditive watermarks." May 2001. IEEE Transactions on Image Processing. vol. 10, Issue 5. pp. 755–766.*
Gonzalez, et al., *Digital Image Processing*, Sec. 4.2, "Enhancement by Point Processing," 1992, pp. 166–189.
Jain *Fundamentals of Digital Image Processing*, Sec. 7.2, "Point Operations," 1995 reprint of 1989 publication, pp. 235–241.
"Coding of Still Pictures," JPEG 2000 Part 1 Final Committee Draft Version 1.0, Mar. 16, 2000, 26 pages.
"What is Progressive JPEG?" http;//www.faqs.org/faqs/jpeg–faq/part1/section–11.html, Apr. 1, 2003, 2 pages.
Kutter, "Performance Improvement of Spread Spectrum Based Image Watermarking Schemes Through M–ary Modulation," Lecture Notes in Computer Science, 1999, 16 pages.

* cited by examiner

Primary Examiner—Jayanti K. Patel
Assistant Examiner—Aaron Carter
(74) Attorney, Agent, or Firm—Joel R. Meyer; Digimarc Corporation

(57) ABSTRACT

The disclosure describes a method of progressively decoding a digital watermark on a distributed computing platform. A client device equipped with a digital camera, such as a PDA or cell phone, captures a digital image of a watermarked object, and pre-filters the image to isolate a portion of the image data suspected of containing a digital watermark. The pre-filter de-correlates a portion of the image data suspected of containing a digital watermark from the remaining host image signal using a predictive filter. The client then quantizes the filtered data and progressively transmits the quantized data to a watermark decoder. The progressive transmitter sends image data as necessary to achieve a valid decoding operation. To reduce bandwidth requirements, the transmitter starts with the most highly quantized version of the filtered image, and sends lesser quantized versions until the watermark decoder completes a successful decoding operation.

17 Claims, 1 Drawing Sheet

PROGRESSIVE WATERMARK DECODING ON A DISTRIBUTED COMPUTING PLATFORM

TECHNICAL FIELD

The invention relates to digital watermarking.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the hidden watermark in a host media signal, and a decoder that detects and reads the embedded watermark from a signal suspected of containing a watermark (a suspect signal). The encoder embeds a watermark by altering the host media signal such that the alterations are substantially imperceptible to viewers or listeners of the rendered signal, yet machine readable. The reading component analyzes a suspect signal to detect whether a watermark is present. In applications where the watermark encodes information, such as a multi-symbol message, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881, 09/553,084 and U.S. Pat. Nos. 6,122,403, which are hereby incorporated by reference.

Decoding a digital watermark from an image can be a computationally complex process, particularly when the watermark is designed to survive geometric distortions and distortions due to printing and image capture through an image capture device. The computational complexity of the decoding process makes it a challenge to implement the decoding process efficiently on hand held computing devices, such as Personal Digital Assistants (PDAs) and cell phones.

This same challenge arises for decoding audio watermarks from an audio stream, particularly a digitized version of audio captured from ambient audio through a microphone. It also arises for decoding video watermarks from a video stream.

The invention provides a method of progressively decoding a digital watermark on a distributed computing platform. The distributed nature of the decoding process enables the computations of a decoding operation to be distributed to two or more devices, such as a client device and a server computer. The progressive nature of the decoding process reduces bandwidth and computation requirements because it progressively passes more detailed image data as necessary to perform an accurate reading operation of the embedded watermark.

In one implementation, a client device equipped with a digital camera, such as a PDA or cell phone, captures a digital image of a watermarked object, and pre-filters the image to isolate a portion of the image data suspected of containing a digital watermark. The pre-filter de-correlates a portion of the image data suspected of containing a digital watermark from the remaining host image signal using a predictive filter. The client then quantizes the filtered data and progressively transmits the quantized data to a watermark decoder.

The progressive transmitter sends image data as necessary to achieve a valid decoding operation. To reduce bandwidth requirements, the transmitter starts with the most highly quantized version of the filtered image, and sends lesser quantized versions until the watermark decoder completes a successful decoding operation.

As it receives the quantized image data, the watermark decoder buffers it until it receives enough to perform a decoding operation. It provides feedback to the progressive transmitter about the results of the decoding operations to regulate the transfer of image data. For example, if a watermark is not detected in highly quantized data, it signals the transmitter to send more detailed image data. Or, alternatively, if the decoder concludes that it is unlikely to be able to extract the watermark message, it may signal the transmitter to send image data from a subsequent frame.

Once decoding is complete, the watermark decoder initiates an action associated with the decoded watermark message. This action may include using the watermark message to look up data or program instructions to forward to the client or another server.

Further features will become apparent with reference to the following detailed description and accompanying drawings.

DETAILED DESCRIPTION

Figure 1:
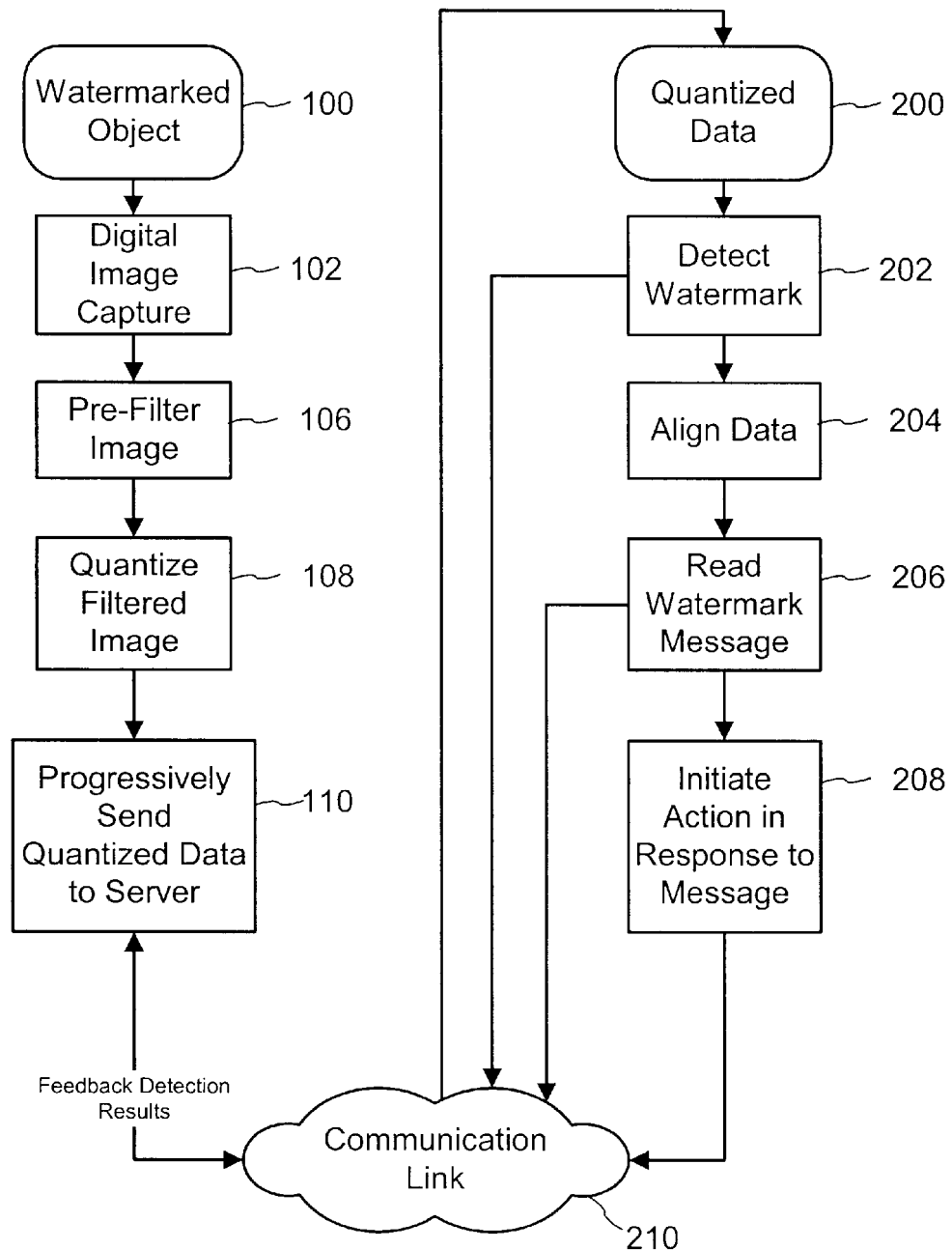
FIG. 1 is a diagram illustrating a progressive watermark decoding process for a distributed computing platform.

FIG. 1 is a diagram illustrating a progressive watermark decoding process for a distributed computing platform. The watermark decoding process scans a digital image of a watermarked object. An image printed on the watermarked object carries a hidden digital watermark with a variable multi-bit message payload as well as a synchronization signal component. The digital watermark subtly modifies image sample values in a particular color channel of a host digital image up or down to encode the message and synchronization components. This digital image is then printed or engraved onto the surface of a physical object, such as paper, product packaging, ID cards etc. A consumer then holds the object to a web camera, which captures digital image frames of the watermarked object (100). A watermark decoding process detects the presence of the watermark, including synchronizing with the embedded synchronization component, and extracts the multi-bit message component. This message carries an index to a database entry indicating an action to take in response to the message.

Blocks 102–110 of FIG. 1 illustrate processes performed on a client device, which captures the digital image, performs pre-processing on the digital image, and progressively sends it to one or more other devices to complete watermark decoding. Blocks 200–208 illustrate processes performed on one or more servers that progressively receive the pre-processed image data from the client.

Before describing the process of FIG. 1 in more detail, it is useful to begin with brief illustration of a watermark embedding process to put the decoding operations in context. In one implementation, the digital watermark embedder repeatedly embeds the watermark signal in blocks of a host digital image. In each block, the embedder modulates image samples within a particular color channel (e.g., the luminance channel, or a channel that varies depending on the host image color). The embedder redundantly encodes the message signal in sub-blocks of the image block. It forms the message from a variable bit payload as well as control and error checking bits. This message is repeated and error correction encoded using a block or convolution code (e.g., BCH, turbo, etc.). The message is also modulated with a carrier signal, such as pseudo random number. The synchronization component is integrated with the message signal as a fixed portion of the message, as part of the carrier signal, and/or as a separate signal. One aspect of the synchronization component forms a constellation of signal peaks in a transform domain, such as the autocorrelation domain and/or Fourier magnitude domain. The embedder inserts the digital watermark signal, including the message and synchronization components, into the host image by adjusting the image samples in the spatial domain and/or spatial frequency domain up or down. Theses adjustments are preferably adapted based on human visibility system modeling to take advantage of the data hiding attributes of the host image. Ultimately, the watermarked image is printed on the host object to form a watermarked object.

Returning to FIG. 1, we now describe the progressive watermark decoding process. The client device, such as a PDA or cell phone, captures digital image frames of the watermarked object through a digital camera (102). The client then pre-filters the image to segregate a portion of the image likely to contain a recoverable digital watermark signal (106). One aspect of this filtering is to transform the color space of the digital image into the color channel or channels in which the watermark has been embedded.

Another aspect is to identify a block of each of the incoming frames that is a likely candidate to have a recoverable digital watermark signal. One implementation segments the center block of each frame and discards the remainder of the frame. An alternative implementation performs an analysis of the image content, looking for spatial block areas that are likely to have a strong watermark signal. This analysis includes, for example, identifying spatial areas with high signal activity (particularly in certain spatial frequency bands), such as textures and areas where there is a high density of image edges. In such areas, the human visibility system modeling of the embedder causes the embedder to place more watermark signal energy due to the greater data hiding capability of the host image, and as such, the watermark signal is likely to be more detectable at these locations. Using such an analysis the pre-processor identifies a block within the frame that is a good candidate for watermark detection. An enhancement to this approach is to rank candidates based on signal activity metrics, and queue the blocks for transmission to the server based on their ranking.

As a further enhancement, the distributed decoding system can be programmed to make block selection of candidate blocks, and transfer candidate blocks based on the computational and memory capabilities of the client, and the bandwidth of the communication link. In particular, when the client software detects that the client device has sufficient processor resources and memory, it can select additional candidate blocks for watermark detection, and buffer them for progressive transmission to the server. The client then forwards candidate blocks to the server as a function of the available bandwidth, the server's availability, and the decoding results from previous blocks. As bandwidth and server availability increases, the client sends more blocks from the current frame, unless the decoding results returned by the server indicate that the watermark signal is weak in that frame.

To further regulate resource usage, the client can spatially scale the image (e.g., down sample) to adjust the size of the image to the available memory, bandwidth and processing resources of the client.

Another aspect of the filtering is to segregate the digital watermark from its host image to the extent possible. One way to accomplish this is to apply a de-correlating filter to separate an estimate of the digital watermark signal from the host image. One way to segregate an estimate of the digital watermark signal is to band-pass filter the image to isolate spatial frequency content that is likely to have a larger ratio of watermark signal to host signal energy.

Another way to estimate the digital watermark signal is to apply a predictive filter to predict the original image, which enables the pre-processor to isolate the residual portion of the signal with a larger ratio of watermark signal to host signal energy. One such predictive filter compares each image sample with neighboring samples to derive an estimate of the watermark signal. For example, it compares a center sample with 8 surrounding samples, and measures the extent to which the center is greater than or less than the neighbors. For efficient implementation, a non-linear predictive filter can be designed as a look up table that takes each difference value between the center sample and the neighbors as input, looks up an output value (either positive or negative, optionally with varying magnitude, depending on the difference value) for each comparison, and sums the output values. The output of this non-linear filter provides an estimate of the watermark signal, which has been embedded by adjusting the image samples up or down.

The result of the pre-filtering operation comprises a reduced version of the received image frame. In particular, it comprises a block within an image frame, representing an estimate of the digital watermark signal.

As shown in block 110, the pre-processor quantizes this block of image data into lower levels of detail. In particular, the digital watermark signal modifies the host image up or down. As such, the pre-filter estimates these adjustments, and the quantizer quantizes the estimated adjustments. At the lowest level of detail, the quantized data comprises a bit of binary information, indicating an up or down adjustment per sample in the selected image sample block. At the next level, the quantized data comprises two bits of binary information, including two levels of detail for a positive adjustment, and two levels of detail for a negative adjustment. In this particular implementation, the finest level of detail includes four bits of information, including 8 levels of positive adjustment and 8 levels of negative adjustment.

The client queues the quantized levels of detail for sending to a server for watermark decoding, and progressively transmits the levels, starting at the lowest level of detail (110). Experiments show that in most cases, a successful read operation occurs on quantized data including two bit planes per image sample in the selected block of an image frame captured from the camera. As such, the server provides feedback on the decoding results (namely, whether it has a successful detect and read), and the client proceeds to send the next quantized block when it appears that a successful read operation will not occur for the current block. Bandwidth permitting, the client continues to send data for a current block until the server reports that reading from that block is futile. At that point, the progressive transmitter sends the next block.

The client may choose the next block from the next frame, or from the current frame in the case where the block analysis routine has identified multiple strong candidate blocks in the current frame.

The client and server communicate over a communication link (210). In one implementation, the communication link comprises a TCP/IP connection over a computer network, namely, the Internet. Other communication protocols and physical transport layers may be used as well, including protocols like UDP and/or protocols used for networked PDAs, cell phones, etc. Some examples or wireless communication protocols that may be used in a distributed architecture for digital watermark decoding include Blue Tooth, GSM and CDMA, to name a few.

For example, a blue tooth enabled hand held image capture device can function as the client in the distributed watermark decoding method. In this example, the hand held reader captures the image, pre-filters it, and progressively transmits the filtered image data to a computer, which completes the decoding operation. The computer itself may be connected to the Internet to send the extracted watermark payload to a server, which looks for related information or content in its database, and returns it to the user's computer or personal digital library accessible via a web interface on the Internet.

Referring to the right side of FIG. 1, the server receives quantized data (200) from the client. While FIG. 1 shows one server decoding process, the distributed architecture may also be designed to include multiple decoding processes or threads of execution on one or more server computing devices or processors within a server. In a case of multiple, parallel decoding processes, the client broadcasts the quantized data to each decoding process, which independently processes the quantized data and reports the results of the decoding operation. The server can transmit the watermark message payload back to the client and/or forward it to a re-direction server for further handling.

As shown in block 202, the decoding process analyzes the quantized block of image data to detect the presence of a watermark. In one implementation, this entails detecting the synchronization component of the digital watermark, and using that component to ascertain the geometric distortion parameters of the block, such as rotation, scale, and translation of the block.

Next, the decoding process uses the geometric distortion parameters to align the quantized image data (204). In one implementation, the alignment process operates in stages in conjunction with the detection process. First, the detection process detects transform domain peaks. The measurement of the peaks provides a preliminary indicator of the presence of the watermark. The decoding process uses a correlation metric to evaluate the presence of the watermark and reports back to the client as shown by the arrow emanating from block 202 to the communication link. At this point, the decoding process may instruct the client to begin sending data for the next block when the preliminary detection result indicates that it is unlikely to extract the digital watermark message.

When the preliminary detection metric is positive, the detection process derives rotation and scale parameters from the detected peak locations and the expected orientation of the peaks in synchronization component. Using these parameters, the alignment process rotates and scales the image data to approximate its original orientation. Next, the alignment process uses a known component of the digital watermark to estimate translation. The translation parameters provide a point of reference to extract embedded message symbols from the quantized data.

Next, the decoding process reads the watermark from the quantized message data (206). As noted previously, the client implementation provides an estimate of the digital watermark signal as an array of positive or negative adjustments. The message reader extracts message symbol estimates from this array by demodulating these estimates from the array using the pseudo random carrier signal and the inverse of the modulation function in the embedder. This process generates multiple estimates for each error correction encoded message symbol. As such, the aggregate of these estimates for each symbol provides a soft bit estimate for an error correction encoded symbol. The reader then performs error correction decoding compatible with the embedder. The error correction decoded result may undergo further error checking to validate the message.

When a valid message is decoded, the server reports this event back to the client as shown by the arrow from block 206 back to the communication link. The watermark message payload may include one or more fields of information, including information about the watermarked object, an index, control flags or instructions, etc. The decoding process may either initiate an action in response to the message, or forward the message to the client or another server to initiate an action related to the watermarked object 208).

In one application of this technology, an identifier in the message payload is used to look up a responsive action related to the watermarked object. One such action is to return a network address of a network resource, such as a web page or other program or service to return to the client. For example, the decoding server passes the identifier to a re-direction server, which in turn looks up a corresponding Uniform Resource Locator (URL) and returns it to the client. This look up operation may also involve other context information, such as information about the user of the client device or capabilities of the device, so that the information returned is tailored to the user and/or device.

Software on the client device, such as an Internet browser, then fetches a web page at the specified URL. A number of variations are possible. For example, the re-direction server can return a web page directly to the client, including links to get information or perform electronic transactions relating to the watermarked object. For more information about this type of use of a digital watermark, see U.S. Pat. No. 6,122,403, and pending U.S. patent application Ser. Nos. 09/571,422, and 09/563,664, which are hereby incorporated by reference.

While the above technique is illustrated in the context of a watermarked object, a similar distributed and/or progressive decoding operation may be performed on watermarked audio and video. For example, in the case of watermarked audio, the user holds up the microphone of a client device, such as a cell phone or PDA, to ambient audio, embedded with a digital watermark. The client DSP then pre-filters digitized audio from the microphone to de-correlate the watermark signal from the host audio signal, and progressively sends a quantized version of the resulting estimate of the watermark signal to a decoding process for watermark detection and message extraction operations as above.

The technique described above operates on a video stream captured from a digital camera. However, the video stream may come from other sources as well, such as in streaming or broadcast video delivery to a cell phone or PDA over a wireless connection. In these cases, the client and server process watermarked image blocks from frames of the video stream as above.

Another approach for progressive watermark decoding on a distributed computing system is to transmit varying spatial resolution images progressively from the client to the server until the server achieves a successful decode of the digital watermark message payload. In particular, the client initially sends a low spatial resolution image and progressively sends higher resolution versions of that image to the server. Systems that generate JPEG 2000 images and progressive scan JPEG images are particularly well suited for this application because both systems format the image so that the client can generate a low resolution image version, followed by several iterations of more resolution. In such a system, the server tries to detect the watermark on the low resolution image version first, then again with the next resolution until it successfully extracts a valid watermark message payload.

In certain applications, it is expected that the server will process requests to decode watermarks from blocks transmitted by a large number of clients. In such applications, the server infrastructure includes a number of enhancements to support these requests. One enhancement is distributed request handling. The server system is designed to handle watermark decoding requests from several clients. To process multiple requests, the server has a handler interface that receives the request and queues it for processing on one of many processing units across one or more computers. Further processing requests are supported using multiple threads of execution in the decoding process, including a thread to manage buffering of blocks from a client, one or more threads to detect and read the watermark message from each block, and a thread for dispatching the embedded message extracted from a block.

The decoding process supports multiple input and output streams. Each input stream refers, for example, to the queue of blocks from a particular client. Each output stream refers to the detection and decoding results transferred from the decoding process.

The server system comprises one or more processor units over which the processing load from multiple block decoding requests are distributed. A load balancing process monitors the availability of processing units and regulates the processing load distributed to these processing units based on the availability of processing cycles.

The distributed decoding architecture can also be adapted for client devices that do not always have an available connection to the server system. For example, in devices that are not connected, the client software caches pre-filtered and quantized image blocks. Later, when the user places the client device in a docking station for synchronization with a computer connected to the docking station, the client passes the cached blocks to the server. The server may reside in the docking station computer, or in a computer connected to the docking station computer over a network such as the Internet. In short, the blocks may make one or more hops from client device, to an intermediate device, and finally, to decoding server. With each hop, the transmission protocol may change, such as a serial connection (USB) to the docking station computer, and TCP/IP connection from docking station computer to decoding server.

The data returned in response to the watermark message may be displayed on the docking station computer, may be downloaded to the PDA for display, and/or may be sent to a database on the Internet that the user can access at his or her convenience to download information related to the watermarked object via the embedded watermark. One example is a music file that is transferred to the user's personal library on the Internet in response to showing a watermarked CD or music promotion poster to the client's camera. Another example is an electronic coupon or ticket that is forwarded to the user's e-mail account in response to showing a watermarked object to the client's camera.

The distributed architecture performs efficient watermark decoding by performing a lossy compression of a watermarked media signal that discards much of the media signal information, yet leaves a residual media signal from which the digital watermark is decoded. To further reduce bandwidth requirements, the client may also apply a lossless compression process, such as run length or entropy coding (e.g., Huffman or Arithmetic coding) to reduce the residual image further in size. The losslessly compressed residual image then requires less bandwidth to send to the server at the expense of further lossless compression and decompression steps.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of decoding a digital watermark comprising:
   receiving an image frame captured of a watermarked object;
   pre-filtering the image frame to derive an estimate of a digital watermark signal;
   quantizing the estimate of the digital watermark signal into two or more levels of detail; and
   progressively sending the quantized estimate to a watermark decoding process for extraction of a digital watermark message, starting with the lowest level of detail.

2. A computer readable medium on which is stored instruction for performing the method of claim 1.

3. The method of claim 1 wherein the pre-filtering includes band pass filtering the image frame to isolate image content having a higher watermark signal to host image signal ratio.

4. The method of claim 1 wherein the pre-filtering includes de-correlating a digital watermark signal from a host image signal to compute the estimate of the digital watermark signal.

5. The method of claim 4 wherein the de-correlating includes performing a predictive filtering to estimate the digital watermark signal.

6. The method of claim 1 wherein the quantizing comprises reducing bit depth of the estimate of the digital watermark signal.

7. The method of claim 1 wherein the estimate of the digital watermark is represented as an estimate of positive and negative adjustments to a host image that has been embedded with the digital watermark; and the positive and negative adjustments are quantized by reducing the bit depth used to represent the amount of the adjustments.

8. The method of claim 1 including:

receiving feedback about results of a watermark decoding operation on the quantized data, and response to the feedback, controlling the progressive transmission of additional watermarked data to the watermark decoding process.

9. A method of progressive digital watermark decoding comprising:

in a client, receiving a watermarked media signal;

quantizing the watermark media signal into two or more levels of detail;

progressively sending the quantized media signal to a watermark decoding server, starting with sending quantized data represented with a first set of quantization levels, and progressively sending more detailed versions of the quantized media signal represented with increasingly more quantization levels than the first set to reduce the bandwidth needed between the client and server to decode a digital watermark message successfully from the media signal on the server.

10. The method of claim 9 including:

isolating an estimate of a digital watermark signal in the watermarked media signal, wherein the quantizing comprises quantizing the isolated estimate of the digital watermark signal.

11. A computer readable medium on which is stored instruction for performing the method of claim 9.

12. The method of claim 9 wherein the client and server comprise remote devices interconnected via a communication link.

13. A method of efficient digital watermark decoding comprising:

receiving a watermarked media signal;

performing a lossy compression of the watermarked media signal that discards part of the media signal information, yet leaves a residual media signal from which the digital watermark is decoded;

progressively sending the residual media signal at successively higher levels of detail to a watermark decoder for extracting the digital watermark until the digital watermark is successfully extracted from the residual media signal.

14. A watermark decoding server method comprising:

receiving a pre-filtered image block and a watermark decoding request from a client, where pre-filtering on the client has reduced an image to an estimate of a digital watermark signal; and performing watermark detection on the pre-filtered block, including reporting a detection result to the client to regulate requests for decoding additional blocks from the client.

15. A watermark decoding server method comprising:

receiving a pre-filtered image block and a watermark decoding request from a client, where pre-filtering on the client has reduced an image to an estimate of a digital watermark signal;

receiving quantized versions of the prefiltered block, starting with lower level of detail, and increasing with each; and performing watermark detection on the pre-filtered block, including reporting a detection result to the client to regulate requests for decoding additional blocks from the client.

16. The method of claim 14 including:

receiving a plurality of pre-filtered image blocks and watermark decoding requests from different clients;

and managing watermark decoding operations for each of the pre-filtered image blocks.

17. A method of efficient digital watermark decoding from a watermarked media signal that has been created by embedding a digital watermark into a host media signal, the method comprising:

receiving the watermarked media signal;

performing a lossy compression of the watermarked media signal that discards part of the media signal information, yet leaves a residual media signal from which the digital watermark is decoded, wherein the lossy compression is performed at a receiver to isolate a portion of the watermarked media signal likely to have a higher watermark signal to host media signal ratio;

sending the isolated portion from the receiver to a watermark decoder;

extracting a digital watermark message from the residual media signal at the watermark decoder.

* * * * *

UNITED STATES PATENT AND TRADEMARK OFFICE
CERTIFICATE OF CORRECTION

PATENT NO.          : 6,724,914 B2
APPLICATION NO. : 09/978332
DATED                  : April 20, 2004
INVENTOR(S)        : Brundage et al.

It is certified that error appears in the above-identified patent and that said Letters Patent is hereby corrected as shown below:

<u>Title page</u>, Section 75, Inventors: Add --Ravi K. Sharma--.

Column 10, line 22, change "each; and" to --each version; and--.

Signed and Sealed this

Twenty-eighth Day of November, 2006

JON W. DUDAS
*Director of the United States Patent and Trademark Office*